(12) United States Patent
Paradiso et al.

(10) Patent No.: US 6,587,631 B2
(45) Date of Patent: Jul. 1, 2003

(54) FIBER-OPTIC BACKPLANE METHOD AND APPARATUS

(75) Inventors: Louis R. Paradiso, Satellite Beach, FL (US); Kenneth J. Nerius, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/005,042

(22) Filed: Dec. 4, 2001

(65) Prior Publication Data

US 2003/0103752 A1 Jun. 5, 2003

(51) Int. Cl.[7] ................................................ G02B 6/00
(52) U.S. Cl. ...................................................... 385/134
(58) Field of Search ................................ 385/134, 135, 385/136, 137, 114, 59, 60, 139, 88, 92, 14, 49

(56) References Cited

U.S. PATENT DOCUMENTS

| | | | |
|---|---|---|---|
| 5,937,133 A | 8/1999 | Moss et al. | 385/137 |
| 5,980,312 A | 11/1999 | Chapman et al. | 439/540.1 |
| 6,427,034 B1 * | 7/2002 | Meis et al. | 385/14 |

* cited by examiner

*Primary Examiner*—Javaid H. Nasri
(74) *Attorney, Agent, or Firm*—Akerman Senterfitt (57) ABSTRACT

The present invention can provide an optical backplane assembly including a structural member for supporting a plurality of optical backplane connectors and a plurality of fiber-optic fabric inter-connectors. Each one of the plurality of fiber-optic fabric inter-connectors can include a substantially flat body portion having legs extending outward from the body portion. Each of the legs can include at least one optical fiber bundle disposed therein and an optical fiber connector for cooperatively engaging selected ones of the plurality of optical backplane connectors. Notably, the body portions of the plurality of fiber-optic fabric inter-connectors can be stacked so as to at least partially overlap one another.

35 Claims, 6 Drawing Sheets

FIBER-OPTIC BACKPLANE METHOD AND APPARATUS

BACKGROUND OF THE INVENTION

1. Technical Field

This invention relates to the field of fiber-optics, and more particularly, to an improved optical backplane.

2. Description of the Related Art

An optical backplane is a structure having a variety of connectors facilitating the interconnection and communication of different systems and components. More specifically, the optical backplane is configured for the interconnection of systems and components having high bandwidth optical interfaces. Conventional optical backplanes, however, also can include electrical connections and suitable interface circuitry for interconnecting systems and components having electrical interfaces. Though optical backplanes can be used within a variety of settings, optical backplanes are often used to interconnect control systems within aircraft. In consequence, optical backplanes must conform to strict size limitations and facilitate the replacement of components with a minimum of downtime.

Conventionally, optical backplanes have been configured according to one of two differing design methodologies. The first design methodology utilizes a series of individual fiber-optic fabric inter-connectors (fabric inter-connectors) for connecting individual pairs of optical backplane connectors. Despite any advantages afforded by this design, this "patch cord" approach can yield a complicated and disorganized conglomeration of fabric inter-connectors. Often, the individual fabric inter-connectors are similar in appearance, if not indistinguishable, from one another making service difficult. Should a fault occur, the individual fabric inter-connectors corresponding to a given system or component must be identified, traced to their respective termination points, and checked to determine which fabric inter-connector is responsible for the faulty connection. Serviceability of the optical backplane becomes even more problematic with regard to "in field" repairs where conditions are typically less than ideal.

The second design methodology seeks to inter-connect all optical backplane connectors using a single, primary fabric inter-connector wherein individual branches with connectors extend off of the main portion. Under this design methodology, the optical fabrics are manufactured as a single inter-connector in either a long fishbone or a serpentine design. The serpentine fabric inter-connector essentially loops throughout the optical backplane in a serpentine or snake-like fashion in an effort to pass in close proximity to many of the optical backplane connectors. The serpentine fabric inter-connector links to the individual optical backplane connectors via small branches extending from the primary serpentine portion. Similar to the serpentine design, the fishbone design has a primary portion running throughout the optical backplane. The fishbone design also can include individual branches extending outward from the backbone portion to make individual connections with the optical backplane connectors.

As was the case with the "patch cord" design, both the serpentine and the fishbone designs have disadvantages. One such disadvantage is that manufacturing a single fabric inter-connector which is capable of making the large number of interconnections necessary within an optical backplane can be difficult. A single flaw within the fabric inter-connector can render the entire piece unusable. Such demanding standards in manufacturability make the fabrication of single fabric inter-connector designs very difficult and costly. Oftentimes, the high performance of an optical backplane does not justify the high cost involved in fabricating the single serpentine or fishbone style fabric inter-connectors.

Another disadvantage of single fabric inter-connector designs is the inability of serpentine or fishbone designs to accommodate optical fibers having large bend radii. By design, single fabric inter-connectors are typically configured to pass in close proximity to optical backplane connectors. Due to the limited size of most optical backplanes, the fabric may be required to make tight bends to properly fit within the optical backplane. Additionally, each of the branches extending from the primary portion of the single fabric inter-connectors also may have to make tight bends to engage particular optical backplane connectors. In contrast, the fibers disposed throughout the optical fabric cannot bend beyond a predetermined bend radius without damaging the fiber or compromising its optical properties. Consequently, the degree to which a fabric inter-connector can be forced into a particular serpentine or fishbone shape, to a large extent, depends upon the bend radii of the optical fibers disposed therein, and not on the shape needed for interconnecting optical backplane connectors.

SUMMARY OF THE INVENTION

The invention disclosed herein provides an improved optical backplane assembly and a method of configuring the optical backplane assembly in accordance with the inventive arrangements disclosed herein. In particular, the invention provides an optical backplane assembly which incorporates a plurality of fiber-optic fabric inter-connectors (fabric inter-connectors), each of which can communicatively link selected optical backplane connectors. Rather than relying upon a single, complex optical fabric design or a series of individual patch cord type optical fabrics, the present invention provides for an optical backplane having several fabric inter-connectors, each having a plurality of legs.

The present invention provides for an optical backplane assembly as well as a method of configuring the optical backplane assembly wherein the fabric inter-connectors can be configured to cooperatively stack and at least partially overlap with one another. Further, the individual fabric inter-connectors can be configured in accordance with the physical dimensions of the optical backplane assembly as well as the physical location of the optical backplane connectors disposed therein. Each individual fabric inter-connector can include a visual identifier distinguishing it from the other optical fabrics within the optical backplane. In consequence, the present invention provides a high degree of manufacturability and an inexpensive design that can meet or exceed the strict size limitations typically imposed upon optical backplanes. Moreover, the present invention can be more easily serviced whether the unit is in production or has been placed in the field.

One aspect of the present invention can include an optical backplane assembly and method of configuring the optical backplane assembly. The optical backplane assembly can be configured to include a structural member for supporting a plurality of optical backplane connectors and a plurality of fabric inter-connectors. Each one of the plurality of fabric inter-connectors can include a substantially flat body portion and a plurality of legs extending outward from the body portion. In one embodiment of the present invention, each of the fabric inter-connectors can include at least three legs.

Each of the legs includes an optical fiber bundle disposed therein and an optical fiber connector for cooperatively engaging selected ones of the plurality of optical backplane connectors. Notably, the body portions of the plurality of fabric inter-connectors can be stacked so as to at least partially overlap one another.

In another aspect of the invention, and in accordance with various embodiments of the inventive method and apparatus disclosed herein, each leg can be configured to include a service loop portion. In consequence, defective optical fiber connectors can be removed and replaced on any leg without having to replace the entire fabric inter-connector. The service loops allow for the excess fabric to re-terminate the optical fiber connectors. Additionally, the fabric inter-connectors can be marked with a unique visual identifier which can appear throughout the body portion and the legs. For example, the unique visual identifier can be a color.

In another aspect of the invention, each of the body portions can be configured to share a common co-equal dimension such as a length or a width. The legs further can be selectively configured to have at least a minimum length so as to accommodate a predetermined minimum bend radius for at least one optical fiber disposed therein.

The structural member can be configured to include a containment structure within which the body portions of the plurality of fabric inter-connectors can be exclusively positioned. Additional containment structures can be provided for securing at least one of the body portions of the plurality of fabric inter-connectors within a containment zone. The containment zone can be exclusive of the optical backplane connectors, whereby the body portions do not substantially obstruct the plurality of optical backplane connectors.

In yet another aspect of the invention, and in accordance with various embodiments of the inventive method and apparatus disclosed herein, the body portion of each one of the plurality of fabric inter-connectors can be configured with a predetermined shape based upon the physical dimensions of the optical backplane assembly and the physical placement of the optical backplane connectors disposed therein. The predetermined shapes can be configured for cooperatively stacking with one another. For example, the predetermined shape of each body portion can be selectively configured not to extend beyond a perimeter of an adjacent one of the body portions. Alternatively, each body portion can be selectively configured to fit within a perimeter of an adjacent one of the body portions so as to leave exposed at least a tab portion of the adjacent body portion.

BRIEF DESCRIPTION OF THE DRAWINGS

There are shown in the drawings embodiments which are presently preferred, it being understood, however, that the invention is not so limited to the precise arrangements and instrumentalities shown.

DETAILED DESCRIPTION OF THE INVENTION

The invention disclosed herein provides an improved optical backplane which incorporates a plurality of fiber-optic fabric inter-connectors (fabric inter-connectors) wherein each one can communicatively link selected optical backplane connectors. In contrast to prior art optical backplane configurations, the invention provides for an optical backplane utilising several fabric inter-connectors having a high degree of manufacturability. The plurality of fabric inter-connectors can be configured to stack with one another and to at least partially overlap with one another. Additionally, the fabric inter-connectors can be configured in.accordance with the physical dimensions of the optical backplane as well as the physical location of the optical backplane connectors disposed therein.

Figure 1:
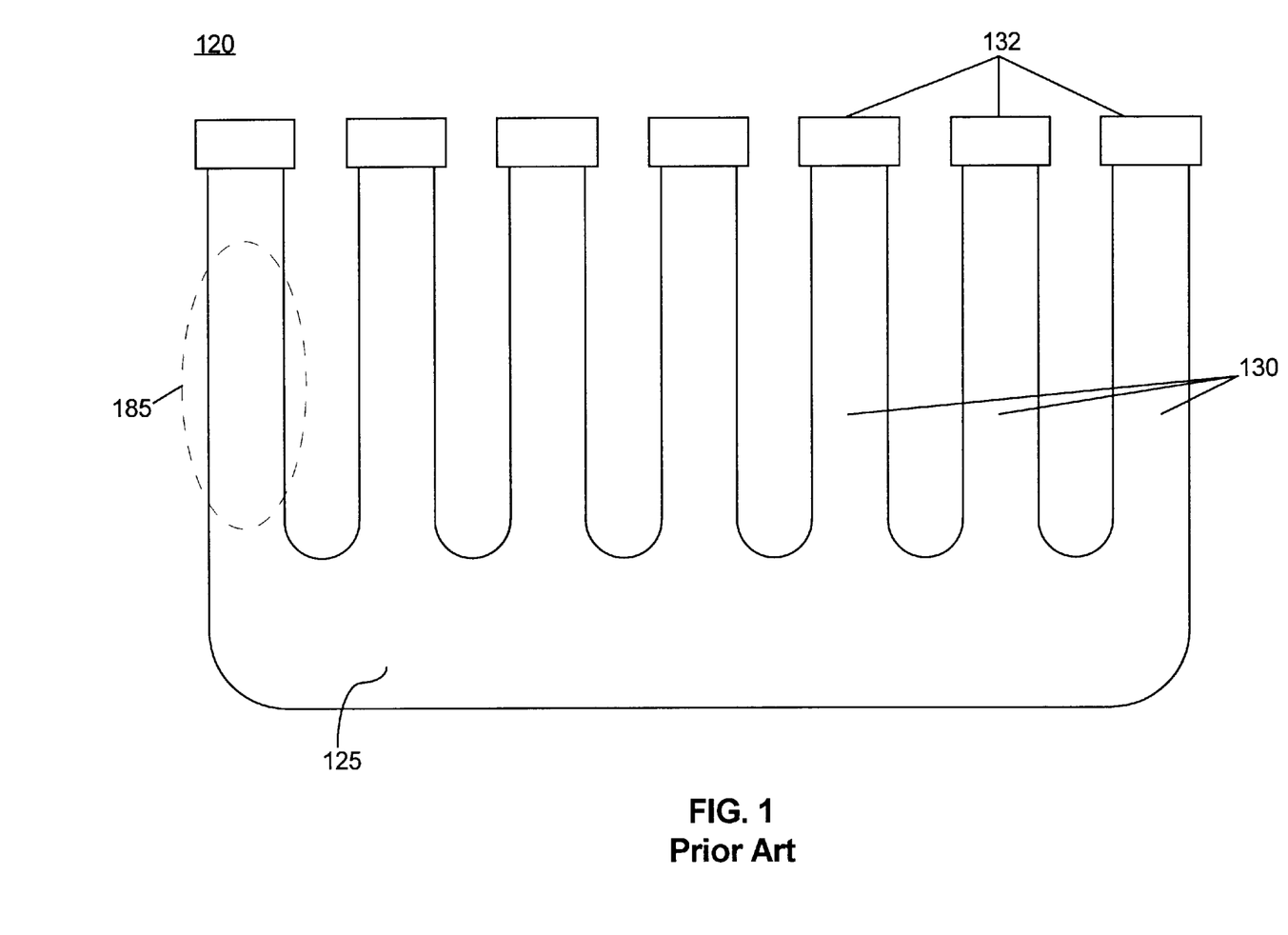
FIG. 1 is a schematic diagram illustrating an exemplary fiber-optic fabric inter-connector an be used with the inventive arrangements disclosed herein.

FIG. 1 is a schematic diagram illustrating an exemplary fabric inter-connector 120 which can be used within the optical backplane of the present invention. The fabric inter-connector 120 can include a body portion 125 and a plurality of legs 130 extending from the body portion. Each of the legs is terminated into an optical connector 132. Although the fabric inter-connector 120 can be substantially flat, it can be manufactured in any of a variety of shapes to accommodate various optical backplane configurations. In particular, the body portion 125, as well as each of the legs 130, can be configured with various lengths, widths, and shapes. In this manner, fabric inter-connectors can be manufactured to connect particular predetermined optical backplane connectors within an optical backplane. Fabric inter-connectors as disclosed herein are commercially available from manufacturers such as U.S. Conec, Ltd., of Hickory, N.C.

In one embodiment of the invention, the legs 130 can include a service loop portion 185. The service loop portion 185 provides added length to the legs such that a poorly terminated connector 132 can be cut off and replaced with a new or different connector thereby eliminating the need to discard the entire fabric inter-connector. The service loop portion can be in the form of excess slack in a leg, or alternatively, can be an actual loop (not shown) in a leg. Regardless, the service loop portion 185 increases the manufacturability of the multi-fabric optical backplane design and facilitates service of the optical backplane.

The fabric inter-connector 120 can include a plurality of legs 130 of various lengths. In one embodiment, the fabric inter-connector 120 can include at least three legs. Still, it should be appreciated that the fabric inter-connector 120 can be configured with any predetermined number of legs so as to communicatively link particular optical backplane connectors within an optical backplane. Each of the legs 130 includes an optical fiber bundle disposed therein. Although the legs can include any suitable number of optical fibers, in a preferred embodiment of the invention, the legs can include 12 optical fibers. Regardless, the optical fibers can be disposed within an adhesive layer which in turn can be located between two substrate layers of the fabric inter-connector.

As shown, each leg can terminate into an optical connector 132. The optical connectors 132 can be complimentary to optical connectors supported within the optical backplane to be discussed herein. Accordingly, the optical connectors can cooperatively engage selected optical backplane connectors. Optical connectors 132 can be any of a variety of suitable optical connectors. For example, in one embodiment, the optical connectors can be MT connectors as are well known in the art. Notably, an MT connector can accommodate legs of the fabric inter-connector having 4, 8, 12, or 24 optical fibers disposed therein.

The fabric inter-connector 120 of FIG. 1 has been incorporated into various embodiments of the present invention to be discussed herein. Accordingly, although further illustrations of the fabric inter-connectors differ from that of FIG. 1, it should be appreciated that such differences are for purposes of illustration only. For example, nodes have been incorporated within the figures to better illustrate the relation between legs and corresponding body portions of the fabric inter-connectors.

Figure 2:
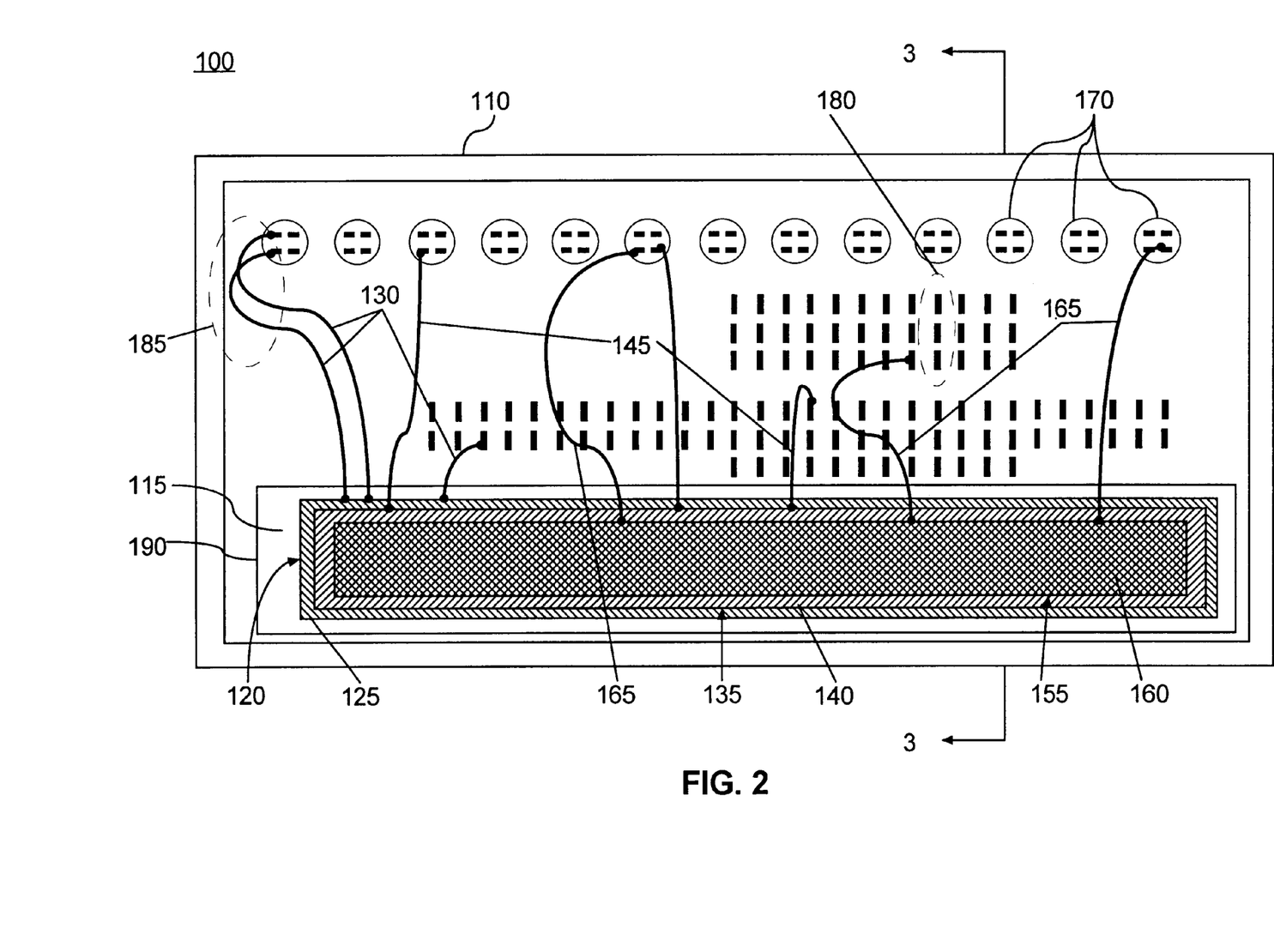
FIG. 2 is a schematic diagram illustrating an exemplary embodiment of the optical backplane disclosed herein.

FIG. 2 is a schematic diagram illustrating an exemplary embodiment of an optical backplane assembly 100 in accordance with the inventive arrangements disclosed herein. As shown in FIG. 2, the optical backplane assembly 100 can include a structural frame 110 which can support a plurality of optical backplane connectors. The optical backplane connectors can be MT connectors 180 for cooperatively engaging MT connectors disposed on the legs of the fabric inter-connectors. The MT connectors can be configured within cylindrical connectors 170 or can be individually disposed within the structural frame 110. The optical backplane connectors 170 and 180 can be arranged in any of a variety of groupings. For example, as shown in FIG. 2, the cylindrical connectors 170 can be arranged in close proximity and substantially aligned with one another. Similarly, the individual MT connectors 180 can be grouped closely and substantially aligned with one another. Still, the optical backplane connectors need not be disposed within the structural frame in any particular ordering or grouping. Moreover, it should be appreciated that the invention is not limited to the use of MT connectors only. Accordingly, any of a variety suitable fiber-optic connectors can be used within the optical backplane assembly 100.

Continuing with FIG. 2, the optical backplane connectors 170 and 180 can be communicatively linked by one or more of the fabric inter-connectors 120 of FIG. 1. In FIG. 2, two additional and similar fabric inter-connectors 135 and 155 are shown for purposes of illustration. Although several fabric inter-connectors are shown, in this case three, it should be appreciated that additional fabric inter-connectors can be incorporated as needed within the optical backplane assembly 100. In any case, the fabric inter-connectors can be substantially aligned and stacked within the structural frame 110 of the optical backplane assembly 100 so as not to substantially obstruct the optical backplane connectors 170 and/or 180. The fabric inter-connectors 120, 135, and 155 can include substantially flat body portions 125, 140, and 160 respectively. Notably, body portion 140 can be smaller in length and/or width than body portion 125 so as to fit within the perimeter of body portion 125. Similarly, body portion 160 can be configured to fit within the perimeter of body portion 140. In this manner, additional fabric inter-connectors can be included wherein each body portion can be configured to fit within, or at least not extend beyond, a perimeter of an adjacent body portion.

The fabric inter-connector 120 can include a plurality of legs 130 extending outward from the body portion for engaging selected optical backplane connectors 170 and/or 180. Similarly, each of fabric inter-connectors 135 and 155 can include a plurality of legs 145 and 165 extending outward from their respective body portions for communicatively linking selected optical backplane connectors 170 and/or 180. As mentioned, the legs 130, 145, and 165 can be configured to include a service loop portion 185 which facilitates the replacement of individual optical fiber connectors.

The fabric inter-connectors 120, 135, and 155 can be configured according to the physical dimensions of the optical backplane assembly 100, and more particularly, for cooperatively stacking with one another within the structural frame 110. In one embodiment of the invention, the structural frame 110 can include a containment structure 190 for securing the body portions of the fabric inter-connectors. For example, the containment structure 190 can be a concave portion of the structural frame 110 or can be defined by a raised ridge surrounding or encompassing the body portions 125, 140, and 160 of the fabric inter-connectors 120, 135, and 155 respectively. Accordingly, the containment structure 190 can define a containment zone 115 within the structural frame 110 to be occupied exclusively by the body portions 125, 140, and 160.

Another feature of the present invention is that each of the fabric inter-connectors can be marked with a unique identifier. For example, each fabric inter-connector can be marked or manufactured with a unique color throughout its body portion and leg portions. In this manner, one fabric inter-connector can be easily identified and distinguished from another one of the fabric inter-connectors to facilitate replacement and/or service of the fabric inter-connector or the optical backplane in general. As an alternative to color, an alphanumeric identifier can be used to distinguish different fabric inter-connectors. For example, a common alphanumeric identifier can be placed on different locations on, or throughout, each fabric inter-connector body portion and corresponding leg portions. In illustration, the optical backplane assembly 100 can be configured such that one fabric inter-connector connects selected optical backplane connectors which are associated with particular related systems or components. That fabric inter-connector can be associated with a particular marker or color. Accordingly, each different grouping of related systems or components can be communicatively linked by a fabric inter-connector having a marker associated with that grouping of components.

Figure 3A:
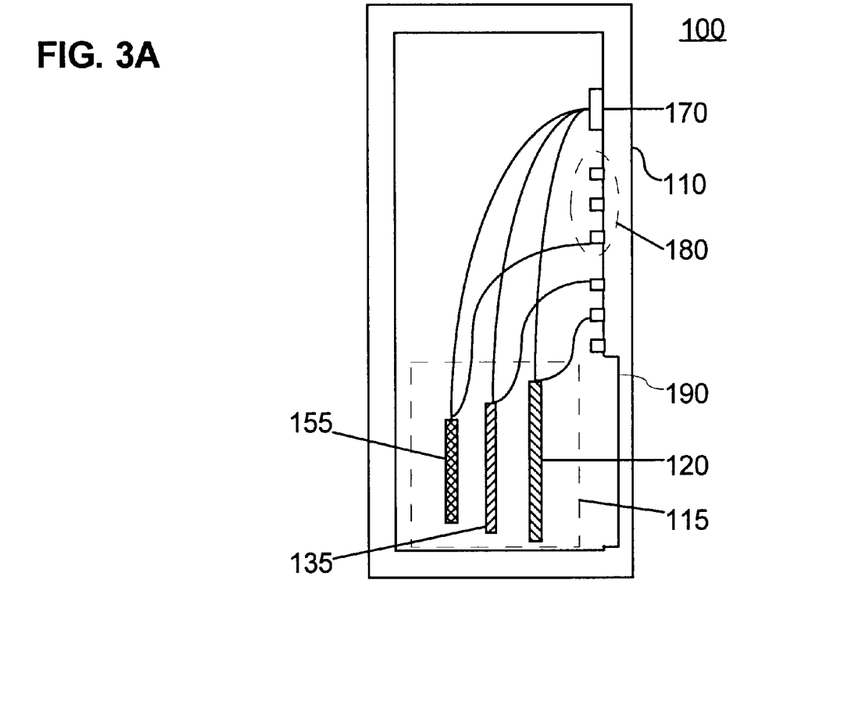
FIG. 3A is a cross-sectional view of the optical backplane of FIG. 2.

FIG. 3A illustrates a cross-sectional view taken along line 3—3 in the embodiment of FIG. 2. As shown in FIG. 3A, the optical backplane assembly 100 can include a structural frame 110 supporting a plurality of optical backplane connectors 170 and 180. The optical backplane connectors 170 and 180 can be arranged in any of a variety of groupings. For example, as shown in FIG. 3A, the cylindrical connectors 170 can be arranged in close proximity and substantially aligned with one another. Similarly, the individual MT connectors 180 can be grouped closely and substantially aligned with one another.

The structural frame 110 includes the containment structure 190, which further defines the containment zone 115. In this case the containment structure 190 is a concave portion of the structural frame 110. The body portions of the fabric inter-connectors 120, 135, and 155 can be positioned within the containment zone 115. Moreover, in one embodiment of the present invention, the body portions, as well as the containment zone 115, can be positioned within the containment structure 190.

Figure 3B:
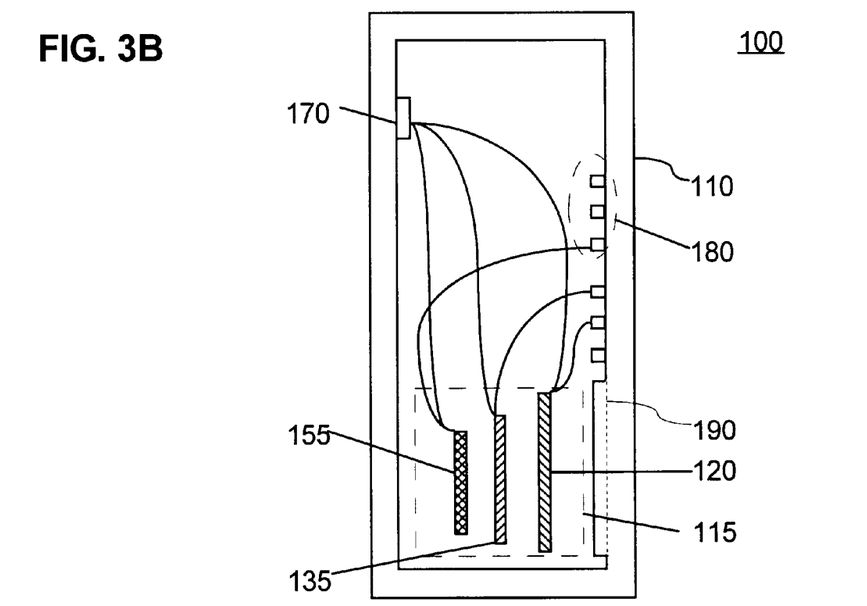
FIG. 3B is a cross-sectional view showing an alternative embodiment of the optical backplane of FIG. 2.

The optical backplane connectors 170 and 180 need not be disposed within the structural frame in any particular ordering or grouping. Accordingly, FIG. 3B is a cross-sectional view along line 3—3 of an alternative embodiment of the optical backplane of FIG. 2 wherein the optical backplane connectors 170 and 180 have been disposed on opposing panels of the optical backplane assembly 100. As shown, the fabric inter-connectors 120, 135, and 155 have been positioned between the opposing panels of the structural frame 110. In this embodiment of the invention, the containment structure 190 is formed by a raised ridge which can surround the body portions of the fabric inter-connectors. Similar to the embodiment of FIG. 3A, the containment structure 190 can define the containment zone 115, which also can be positioned within the containment structure 190.

Figure 4:
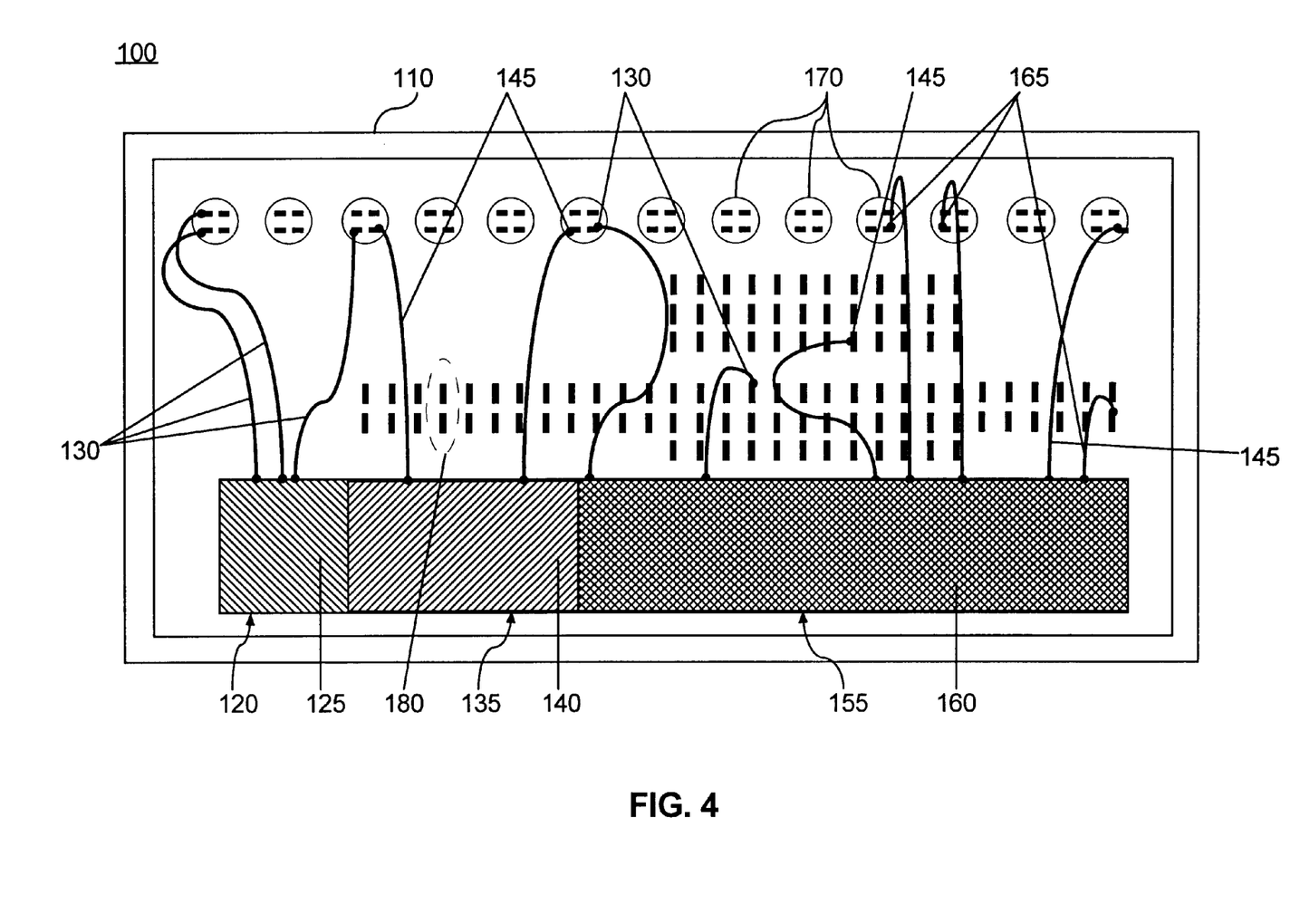
FIG. 4 is a schematic diagram illustrating another exemplary embodiment of the optical backplane disclosed herein.

FIG. 4 is a schematic diagram illustrating another exemplary embodiment of the optical backplane assembly 100 wherein the fabric inter-connectors are substantially aligned and cooperatively stacked one on top of the other. As shown in FIG. 4, each of the body portions 125, 140, and 160 of the fabric inter-connectors 120, 135, and 155 respectively, can be stacked one on top of the other. FIG. 4 depicts the body portions as having a common width dimension with varying lengths. Still, the body portions can be configured to have common lengths with varying widths or similar, if not identical, lengths and widths so as to more closely stack and align with one another. Thus, the body portions can be configured to share at least one common dimension.

As shown in FIG. 4, although the body portions of the fabric inter-connectors can be substantially aligned and cooperatively stacked, particular body portions can extend beyond adjacent body portions, thereby leaving a tab portion exposed or uncovered by the adjacent body portions. In illustration, referring to FIG. 4, a tab portion of body portion 140 is left exposed despite adjacent body portion 160 being located in front of body portion 140. As shown, body portion 140 extends beyond body portion 160 leaving exposed the tab portion of body portion 140. Similarly, a tab portion of body portion 125 extends beyond and is left exposed by body portion 140. Accordingly, as further fabric inter-connectors are added, a tab portion of an adjacent fabric inter-connector located behind the added fabric inter-connector can be left exposed. Regardless of the specific embodiment, as mentioned, the fabric inter-connectors can be configured according to the particular physical dimensions of the optical backplane assembly 100 as well as the physical placement of the optical backplane connectors.

Figure 5:
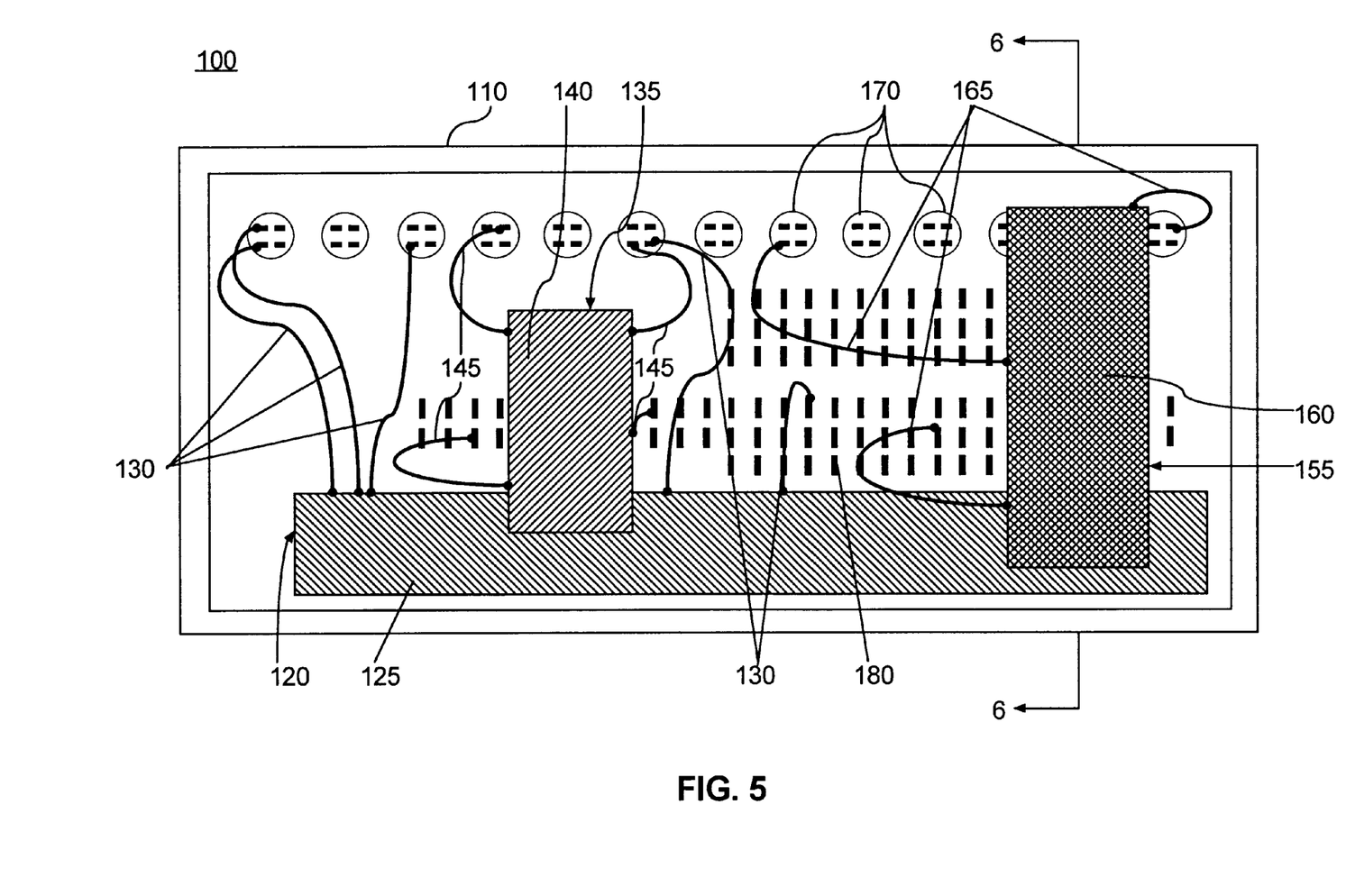
FIG. 5 is a schematic diagram illustrating another exemplary embodiment of the optical backplane disclosed herein.

FIG. 5 is a schematic diagram illustrating another exemplary embodiment of the optical backplane disclosed herein. In this embodiment, the fabric inter-connectors 120, 135, and 160 are at least partially stacked, however, the body portions 125, 140, and 160 need not be substantially aligned with one another. As shown, the body portions of the fabric inter-connectors can be configured with various shapes. Further, the body portions can be disposed throughout the structural frame 110. The shapes and locations of the body portions can be determined largely according to the physical location of the various optical backplane connectors 170 and 180 and the physical dimensions of the optical backplane assembly 100 itself.]

Figure 6A:
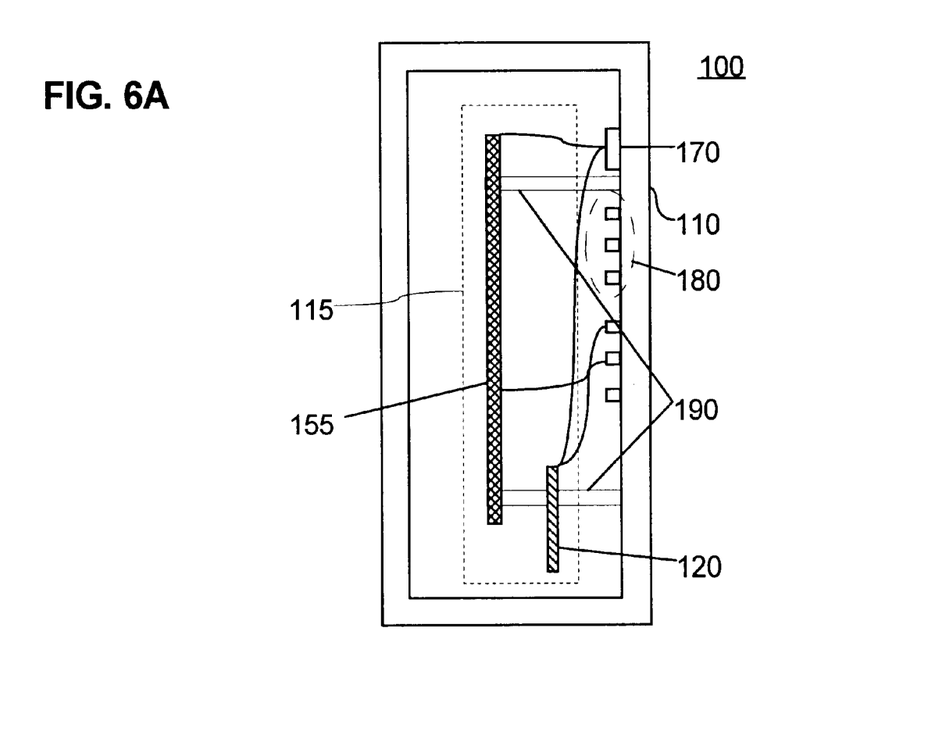
FIG. 6A is a cross-sectional view of the optical backplane of FIG. 5.

FIG. 6A is a cross-sectional view of the embodiment taken along line 6—6 of FIG. 5. As shown in FIG. 6A, the cylindrical optical connectors 170 have been organized and substantially aligned within the structural frame 110. The individual connectors 180 also have been organized and substantially aligned within the structural frame 110. The fabric inter-connectors are preferably secured by at least one containment structure 190. Multiple containment structures 190 can be included as needed to support the necessary number of fabric inter-connectors incorporated into the optical backplane assembly 100.

In this embodiment of the invention, the containment structures 190 can be any of a variety of securing mechanisms for securing the fabric inter-connectors. For example, the containment structures 190 can be shaped to cooperatively support or engage the fabric inter-connectors. Alternatively, the containment structures 190 can include a clip, a pin, an adhesive, hook and loop fasteners, combinations thereof, and the like. Regardless of the particular mechanism used to secure the fabric inter-connectors, the body portions can be located within a containment zone 115 as previously discussed. Still, it should be appreciated that both types of containment structures, for example clips as well as a concave portion of the structural frame 110, can be used to position the body portions of the fabric inter-connectors within the containment zone.

Figure 6B:
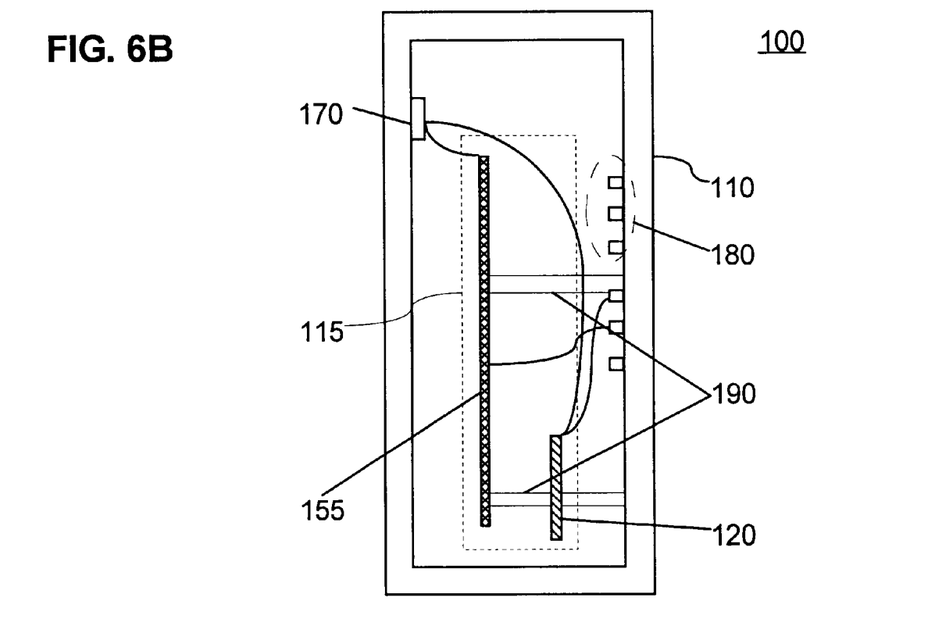
FIG. 6B is a cross-sectional view showing an alternative embodiment of the optical backplane of FIG. 5.

FIG. 6B is a cross-sectional view of an alternative embodiment of the optical backplane of FIG. 5 wherein the optical backplane connectors are disposed within the structural frame with a different ordering. Accordingly, FIG. 6B illustrates an exemplary embodiment wherein the optical backplane connectors 170 and 180 have been disposed on opposing panels of the optical backplane assembly 100. Similar to the embodiment of FIG. 6A, the fabric inter-connectors can be secured within a containment zone 115 by one or more containment structures 190.

The present invention addresses the deficiencies of the prior art by providing a highly serviceable and cost effective optical backplane having a high degree of manufacturability. Importantly, the present invention addresses these issues while adhering to the strict size limitations often imposed upon optical backplanes. Still, the invention disclosed herein can be embodied in other specific forms without departing from the spirit or essential attributes thereof. Accordingly, reference should be made to the following claims, rather than to the foregoing specification, as indicating the scope of the invention.

We claim:

1. An optical backplane assembly comprising:
   a structural frame for supporting a plurality of optical backplane connectors; and,
   a plurality of fiber-optic fabric inter-connectors, each one of said plurality of fiber-optic fabric inter-connectors comprising a substantially flat body portion and having at least three legs extending outward from said body portion, each said leg having at least one optical fiber disposed therein and an optical fiber connector for cooperatively engaging selected ones of said plurality of optical backplane connectors, said body portions of said plurality of fiber-optic fabric inter-connectors being stacked so as to at least partially overlap one another.

2. The optical backplane assembly of claim 1, wherein all said legs have a service loop portion whereby a defective one of said optical fiber connectors can be removed and replaced on any said leg without replacing said fiber-optic fabric inter-connector.

3. The optical backplane assembly of claim 1, wherein each of said fiber-optic fabric inter-connectors is marked with a unique visual identifier.

4. The optical backplane assembly of claim 3, wherein said unique visual identifier appears throughout said body portion and said legs.

5. The optical backplane assembly of claim 3, wherein said unique visual identifier is a color.

6. The optical backplane assembly of claim 1, wherein each of said body portions shares a common co-equal dimension.

7. The optical backplane assembly of claim 1, wherein said legs are selectively configured to have at least a minimum length so as to accommodate a predetermined minimum bend radius for said at least one optical fiber disposed therein.

8. The optical backplane assembly of claim 1, further comprising:
   at least one containment structure for securing at least one of said body portions of said plurality of fiber-optic fabric inter-connectors within a containment zone.

9. An optical backplane assembly comprising:
   a structural member for supporting a plurality of optical backplane connectors;
   a plurality of fiber-optic fabric inter-connectors, each one of said plurality of fiber-optic fabric inter-connectors comprising a substantially flat body portion and having at least three legs extending outward from said body portion, each said leg having at least one optical fiber disposed therein and an optical fiber connector for cooperatively engaging selected ones of said plurality of optical backplane connectors, said body portions of said plurality of fiber-optic fabric inter-connectors being stacked so as to at least partially overlap one another; and,
   at least one containment structure for securing at least one of said body portions of said plurality of fiber-optic fabric inter-connectors within a containment zone, wherein said containment zone is exclusive of said optical backplane connectors, whereby said body portions do not substantially obstruct said plurality of optical backplane connectors.

10. The optical backplane assembly of claim 1, wherein said body portion of each one of said plurality of fiber-optic fabric inter-connectors is configured with a predetermined shape based upon the physical dimensions of said optical backplane assembly and the physical placement of said optical backplane connectors disposed therein, and wherein said predetermined shapes are configured for cooperatively stacking with one another.

11. The optical backplane assembly of claim 10, wherein said predetermined shape of each said body portion is selectively configured not to extend beyond a perimeter of an adjacent one of said body portions.

12. An optical backplane assembly comprising:
   a structural member for supporting a plurality of optical backplane connectors; and,
   a plurality of fiber-optic fabric inter-connectors, each one of said plurality of fiber-optic fabric inter-connectors comprising a substantially flat body portion and having at least three legs extending outward from said body portion, each said leg having at least one optical fiber disposed therein and an optical fiber connector for cooperatively engaging selected ones of said plurality of optical backplane connectors, said body portions of said plurality of fiber-optic fabric inter-connectors being stacked so as to at least partially overlap one another, wherein said body portion of each one of said plurality of fiber-optic fabric inter-connectors is configured with a predetermined shape based upon the physical dimensions of said optical backplane assembly and the physical placement of said optical backplane connectors disposed therein, wherein said predetermined shapes are configured for cooperatively stacking with one another, and wherein each said body portion is selectively configured to fit within a perimeter of an adjacent one of said body portions so as to leave exposed at least a tab portion of said adjacent body portion.

13. An optical backplane assembly comprising:
   a structural frame for supporting a plurality of optical backplane connectors; and,
   a plurality of fiber-optic fabric inter-connectors, each one of said plurality of fiber-optic fabric inter-connectors comprising a substantially flat body portion and having a plurality of legs extending outward from said body portion, each said leg having at least one optical fiber disposed therein and an optical fiber connector for cooperatively engaging selected ones of said plurality of optical backplane connectors, wherein said body portion of each one of said plurality of fiber-optic fabric inter-connectors is configured with a predetermined shape for cooperatively stacking with one another based upon the physical dimensions of said optical backplane assembly and the physical placement of said optical backplane connectors disposed therein, and wherein said body portions are stacked so as to at least partially overlap with one another.

14. The optical backplane assembly of claim 13, wherein said predetermined shape of each said body portion is selectively configured not to extend beyond a perimeter of an adjacent one of said body portions.

15. An optical backplane assembly comprising:
   a structural member for supporting a plurality of optical backplane connectors, and,
   a plurality of fiber-optic fabric inter-connectors, each one of said plurality of fiber-optic fabric inter-connectors comprising a substantially flat body portion and having a plurality of legs extending outward from said body portion, each said leg having at least one optical fiber disposed therein and an optical fiber connector for cooperatively engaging selected ones of said plurality of optical backplane connectors, wherein said body portion of each one of said plurality of fiber-optic fabric inter-connectors is configured with a predetermined shape for cooperatively stacking with one another based upon the physical dimensions of said optical backplane assembly and the physical placement of said optical backplane connectors disposed therein, and wherein said body portions are stacked so as to at least partially overlap with one another, wherein each said body portion is selectively configured to fit within a perimeter of an adjacent one of said body portions so as to leave exposed at least a tab portion of said adjacent body portion.

16. An optical backplane assembly comprising:
   a structural frame for supporting a plurality of optical backplane connectors;
   a plurality of fiber-optic fabric inter-connectors, each one of said plurality of fiber-optic fabric inter-connectors comprising a substantially flat body portion and having a plurality of legs extending outward from said body portion, each said leg having at least one optical fiber disposed therein and an optical fiber connector for cooperatively engaging selected ones of said plurality of optical backplane connectors; and,
   at least one containment structure for securing at least one of said body portions of said plurality of fiber-optic fabric inter-connectors within a containment zone.

17. An optical backplane assembly comprising:
   a structural member for supporting a plurality of optical backplane connectors;
   a plurality of fiber-optic fabric inter-connectors, each one of said plurality of fiber-optic fabric inter-connectors comprising a substantially flat body portion and having a plurality of legs extending outward from said body portion, each said leg having at least one optical fiber disposed therein and an optical fiber connector for cooperatively engaging selected ones of said plurality of optical backplane connectors; and, at least one containment structure for securing at least one of said body portions of said plurality of fiber-optic fabric inter-connectors within a containment zone, wherein said containment zone is exclusive of said optical backplane connectors, whereby said body portions do not substantially obstruct said plurality of optical backplane connectors.

18. A method of configuring an optical backplane assembly comprising:

forming a structural frame for supporting a plurality of optical backplane connectors;

forming a plurality of fiber-optic fabric inter-connectors, each one of said plurality of fiber-optic fabric inter-connectors comprising a substantially flat body portion having at least three legs extending outward from said body portion, each said leg having at least one optical fiber disposed therein and an optical connector for cooperatively engaging selected ones of said plurality of optical backplane connectors;

arranging said plurality of fiber-optic fabric inter-connectors such that said body portions of said plurality of fiber-optic fabric inter-connectors are stacked so as to at least partially overlap with one another; and, communicatively linking selected ones of said plurality of optical backplane connectors with particular ones of said plurality of fiber-optic fabric inter-connectors.

19. The method of claim 18, wherein said forming a plurality of fiber-optic fabric inter-connectors step further comprises forming a service loop portion for all of said legs, whereby a defective one of said optical fiber connectors can be removed and replaced on any said leg without replacing said fiber-optic fabric inter-connector.

20. The method of claim 18, further comprising:

marking each of said fiber-optic fabric inter-connectors with a unique visual identifier.

21. The method of claim 20, wherein said marking step further comprises applying said unique visual identifier throughout said body portion and said legs.

22. The method of claim 20, wherein said marking step further comprises applying a distinct color to each of said fiber-optic fabric inter-connectors.

23. The method of claim 18, wherein said forming a plurality of fiber-optic fabric inter-connectors step further comprises forming each of said body portions to have a common co-equal dimension.

24. The method of claim 18, wherein said forming a plurality of fiber-optic fabric inter-connectors step further comprises forming said legs to have at least a minimum length so as to accommodate a predetermined minimum bend radius for said at least one optical fiber disposed therein.

25. The method of claim 18, further comprising:

forming at least one containment structure for securing at least one of said body portions of said plurality of fiber-optic fabric inter-connectors within a containment zone.

26. A method of configuring an optical backplane assembly comprising:

forming a structural member for supporting a plurality of optical backplane connectors;

forming a plurality of fiber-optic fabric inter-connectors, each one of said plurality of fiber-optic fabric inter-connectors comprising a substantially flat body portion having at least three legs extending outward from said body portion, each said leg having at least one optical fiber disposed therein and an optical connector for cooperatively engaging selected ones of said plurality of optical backplane connectors;

arranging said plurality of fiber-optic fabric inter-connectors such that said body portions of said plurality of fiber-optic fabric inter-connectors are stacked so as to at least partially overlap with one another;

communicatively linking selected ones of said plurality of optical backplane connectors with particular ones of said plurality of fiber-optic fabric inter-connectors; and, forming at least one containment structure for securing at least one of said body portions of said plurality of fiber-optic fabric inter-connectors within a containment zone, and defining said containment zone to be exclusive of said optical backplane connectors, whereby said body portions do not substantially obstruct said plurality of optical backplane connectors.

27. The method of claim 18, wherein said forming a plurality of fiber-optic fabric inter-connectors step further comprises shaping each one of said plurality of fiber-optic fabric inter-connectors according to a predetermined shape based upon the physical dimensions of said optical backplane assembly and the physical placement of said optical backplane connectors disposed therein, said predetermined shapes being configured for cooperatively stacking with one another.

28. The method of claim 27, wherein said shaping step further comprises selectively shaping each said body portion not to extend beyond a perimeter of an adjacent one of said body portions.

29. A method of configuring an optical backplane assembly comprising:

forming a structural member for supporting a plurality of optical backplane connectors;

forming a plurality of fiber-optic fabric inter-connectors, each one of said plurality of fiber-optic fabric inter-connectors comprising a substantially flat body portion having at least three legs extending outward from said body portion, each said leg having at least one optical fiber disposed therein and an optical connector for cooperatively engaging selected ones of said plurality of optical backplane connectors, and shaping each one of said plurality of fiber-optic fabric inter-connectors according to a predetermined shape based upon the physical dimensions of said optical backplane assembly and the physical placement of said optical backplane connectors disposed therein, said predetermined shapes being configured for cooperatively stacking with one another, wherein said shaping step further comprises selectively shaping each said body portion to fit within a perimeter of an adjacent one of said body portions so as to leave exposed at least a tab portion of said adjacent body portion;

arranging said plurality of fiber-optic fabric inter-connectors such that said body portions of said plurality of fiber-optic fabric inter-connectors are stacked so as to at least partially overlap with one another; and, communicatively linking selected ones of said plurality of optical backplane connectors with particular ones of said plurality of fiber-optic fabric inter-connectors.

30. A method of configuring an optical backplane assembly comprising:

forming a structural frame for supporting a plurality of optical backplane connectors;

forming a plurality of fiber-optic fabric inter-connectors, each one of said plurality of fiber-optic fabric inter-connectors comprising a substantially flat body portion having a plurality of legs extending outward from said body portion, each said leg having at least one optical fiber disposed therein and an optical connector for cooperatively engaging selected ones of said plurality of optical backplane connectors;

shaping each one of said plurality of fiber-optic fabric inter-connectors to conform to a predetermined shape configured for cooperatively stacking with one another and based upon the physical dimensions of said optical backplane assembly and the physical placement of said optical backplane connectors disposed therein;

arranging said plurality of fiber-optic fabric inter-connectors such that said body portions of said plurality of fiber-optic fabric inter-connectors are stacked so as to at least partially overlap with one another; and, communicatively linking selected ones of said plurality of optical backplane connectors with particular ones of said plurality of fiber-optic fabric inter-connectors.

31. The method of claim 30, wherein said shaping step further comprises selectively shaping each of said body portions so as not to extend beyond a perimeter of an adjacent one of said body portions.

32. A method of configuring an optical backplane assembly comprising:

forming a structural member for supporting a plurality of optical backplane connectors;

forming a plurality of fiber-optic fabric inter-connectors, each one of said plurality of fiber-optic fabric inter-connectors comprising a substantially flat body portion having a plurality of legs extending outward from said body portion, each said leg having at least one optical fiber disposed therein and an optical connector for cooperatively engaging selected ones of said plurality of optical backplane connectors;

shaping each one of said plurality of fiber-optic fabric inter-connectors to conform to a predetermined shape configured for cooperatively stacking with one another and based upon the physical dimensions of said optical backplane assembly and the physical placement of said optical backplane connectors disposed therein, wherein said shaping step further comprises selectively shaping each of said body portions to fit within a perimeter of an adjacent one of said body portions so as to leave exposed at least a tab portion of said adjacent body portion;

arranging said plurality of fiber-optic fabric inter-connectors such that said body portions of said plurality of fiber-optic fabric inter-connectors are stacked so as to at least partially overlap with one another; and, communicatively linking selected ones of said plurality of optical backplane connectors with particular ones of said plurality of fiber-optic fabric inter-connectors.

33. A method of configuring an optical backplane assembly comprising:

forming a structural frame for supporting a plurality of optical backplane connectors;

forming a plurality of fiber-optic fabric inter-connectors, each one of said plurality of fiber-optic fabric inter-connectors comprising a substantially flat body portion having at least three legs extending outward from said body portion, each said leg having at least one optical fiber disposed therein and an optical connector for cooperatively engaging selected ones of said plurality of optical backplane connectors;

forming a containment structure on said structural member within which said body portions of said plurality of fiber-optic fabric inter-connectors are positioned;

arranging said plurality of fiber-optic fabric inter-connectors within said containment structure such that said body portions of said plurality of fiber-optic fabric inter-connectors are stacked so as to at least partially overlap with one another; and, communicatively linking selected ones of said plurality of optical backplane connectors with particular ones of said plurality of fiber-optic fabric inter-connectors.

34. The method of claim 33, further comprising:

forming at least one additional containment structure for securing at least one of said body portions of said plurality of fiber-optic fabric inter-connectors within a containment zone.

35. A method of configuring an optical backplane assembly comprising:

forming a structural member for supporting a plurality of optical backplane connectors;

forming a plurality of fiber-optic fabric inter-connectors, each one of said plurality of fiber-optic fabric inter-connectors comprising a substantially flat body portion having at least three legs extending outward from said body portion, each said leg having at least one optical fiber disposed therein and an optical connector for cooperatively engaging selected ones of said plurality of optical backplane connectors;

forming a containment structure on said structural member within which said body portions of said plurality of fiber-optic fabric inter-connectors are positioned, and defining a containment zone which is exclusive of said optical backplane connectors, whereby said body portions do not substantially obstruct said plurality of optical backplane connectors;

arranging said plurality of fiber-optic fabric inter-connectors within said containment structure such that said body portions of said plurality of-fiber-optic fabric inter-connectors are stacked so as to at least partially overlap with one another; and, communicatively linking selected ones of said plurality of optical backplane connectors with particular ones of said plurality of fiber-optic fabric inter-connectors.

* * * * *